United States Patent
Stephens et al.

(10) Patent No.: US 10,833,545 B2
(45) Date of Patent: Nov. 10, 2020

(54) ROTOR FOR HYBRID HOMOPOLAR MACHINE

(71) Applicant: Unison Industries, LLC, Jacksonville, FL (US)

(72) Inventors: Charles Michael Stephens, Pattersonville, NY (US); Daniel Michael Saban, Norwich, NY (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 388 days.

(21) Appl. No.: 15/358,086

(22) Filed: Nov. 21, 2016

(65) Prior Publication Data

US 2018/0145551 A1 May 24, 2018

(51) Int. Cl.
| | | |
|---|---|---|
| H02K 1/27 | (2006.01) | |
| H02K 19/18 | (2006.01) | |
| H02K 21/20 | (2006.01) | |
| H02K 1/14 | (2006.01) | |

(52) U.S. Cl.
CPC ........... *H02K 1/2753* (2013.01); *H02K 1/146* (2013.01); *H02K 19/18* (2013.01); *H02K 21/20* (2013.01); *H02K 1/145* (2013.01); *H02K 1/278* (2013.01); *H02K 2201/06* (2013.01)

(58) Field of Classification Search
CPC ...... H02K 1/145; H02K 1/146; H02K 1/2706; H02K 1/2753; H02K 1/276; H02K 1/278; H02K 16/00; H02K 19/18; H02K 21/20; H02K 29/03; H02K 2201/06; H02K 2213/03
USPC ...................................................... 310/156.47
See application file for complete search history.

(56) References Cited

U.S. PATENT DOCUMENTS

| | | |
|---|---|---|
| 6,777,847 B1 | 8/2004 | Saban et al. |
| 2007/0018523 A1* | 1/2007 | Ionel ...................... H02K 21/16 |
| | | 310/156.47 |
| 2012/0169171 A1 | 7/2012 | Jansen et al. |
| 2017/0063188 A1* | 3/2017 | Lipo .................... H02K 1/2766 |

* cited by examiner

*Primary Examiner* — Jue Zhang
*Assistant Examiner* — David A. Singh
(74) *Attorney, Agent, or Firm* — Wood IP LLC (57) ABSTRACT

There is provided an electric machine that includes a rotor comprising a pole and magnet assemblies divided axially in a first subsection and a second subsection. Each of the first and second subsections includes poles and magnets, and the poles and magnets of the first subsection are offset from the poles and magnets of the second subsection.

20 Claims, 7 Drawing Sheets

ROTOR FOR HYBRID HOMOPOLAR MACHINE

I. TECHNICAL FIELD

The present disclosure relates to rotors. More particularly, the present disclosure relates to rotors used in hybrid homopolar machines.

II. BACKGROUND

Homopolar machines typically include a rotor, a stator, and a conductor. The stator can include two stacks, each including a set of teeth that are spaced around an inner surface with a predetermined slot pitch. The stator teeth are wound with the conductor, which can include a field coil disposed directly over an insulated armature winding. On the other hand, the rotor includes a shaft around which there is pressed a hub configured to support two pole and magnet assemblies, which, when the rotor is assembled with the stator, coincide in position with the stator stacks. In a hybrid homopolar machine, each of the rotor's pole and magnet assemblies includes flux-conductive and permanent magnet regions that are alternated in a peripheral direction.

In typical hybrid homopolar machines, the output voltage as a function of the rotor's position is typically a sinusoidal signal superimposed with ripples, the ripples being higher order harmonics of the signal. The number of harmonics that are superimposed in the signals are a result of the number of stator teeth associated with each magnetic pole of the rotor. As such, ripples in the output voltage signals are inherent to conventional hybrid homopolar machines.

When used to drive a load, i.e., when the electric machine is used as an electric generator, the ripples in the output voltage can cause significant heating losses at the load, as well as within the electric machine. As such, these adverse operational characteristics can cause inefficient operation of the load, as well as, increased cost. For example, the larger the power consumption of the load, the larger the losses, and thus the more energy is wasted, and the more costly it is to operate the load.

III. SUMMARY

The embodiments featured herein help solve or mitigate the above noted issues as well as other issues known in the art. For example, the embodiments provide a hybrid homopolar machine whose output voltage ripples are significantly reduced or removed in comparison to the output voltage of typical hybrid homopolar machines. The embodiments thus provide means for operating a hybrid homopolar machine to drive a load with minimal losses. Generally, the embodiments featured herein reduce or eliminate the coupling of flux harmonics between the rotor and the stator of a hybrid homopolar machine.

In some embodiments, magnets of a "north disk" of the rotor are skewed one slot pitch over the axial length of the disk, and the magnets of a "south disk" of the rotor are skewed one slot pitch over the axial length of the disk but rotationally opposite from the north disk, thus forming a herringbone pattern.

The above-mentioned exemplary disk arrangement can be implemented in concert with optimizing the magnet pole arc and the stator slot opening size, as well as with flux shaping by introducing appropriately sized and spaced holes in the laminations at the edge of the magnets. Further, the exemplary arrangement can be implemented by shaping the magnets' face (or its bridge in the case of an embedded magnet design). Alternatively, each north disk and south disk can be fabricated in two identical sections then assembled such that they are rotated by one-half slot pitch. When the north disk and south disk are aligned, the two most innermost sections can have the same rotation direction. The above-described arrangement is termed "step skewing" and will be described in further detail below.

One embodiment provides an electric machine that includes a rotor comprising a pole and magnet assembly divided axially in a first subsection and a second subsection. Each of the first and second subsections includes flux conducting poles and permanent magnets, and the poles and magnets of the first subsection are offset from the poles and magnets of the second subsection.

Another embodiment provides an electric machine that includes a stator and a rotor. The stator includes a first stator stack and a second stator stack. The rotor includes a first pole and magnet assembly corresponding to the first stator stack and a second pole and magnet assembly corresponding to the second stator stack. The first pole and magnet assembly and the second pole and magnet assembly are each divided axially in a first subsection and a second subsection. Each of the first and second subsections includes poles and magnets, and the poles and magnets of the first subsection are offset from the poles and magnets of the second subsection.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
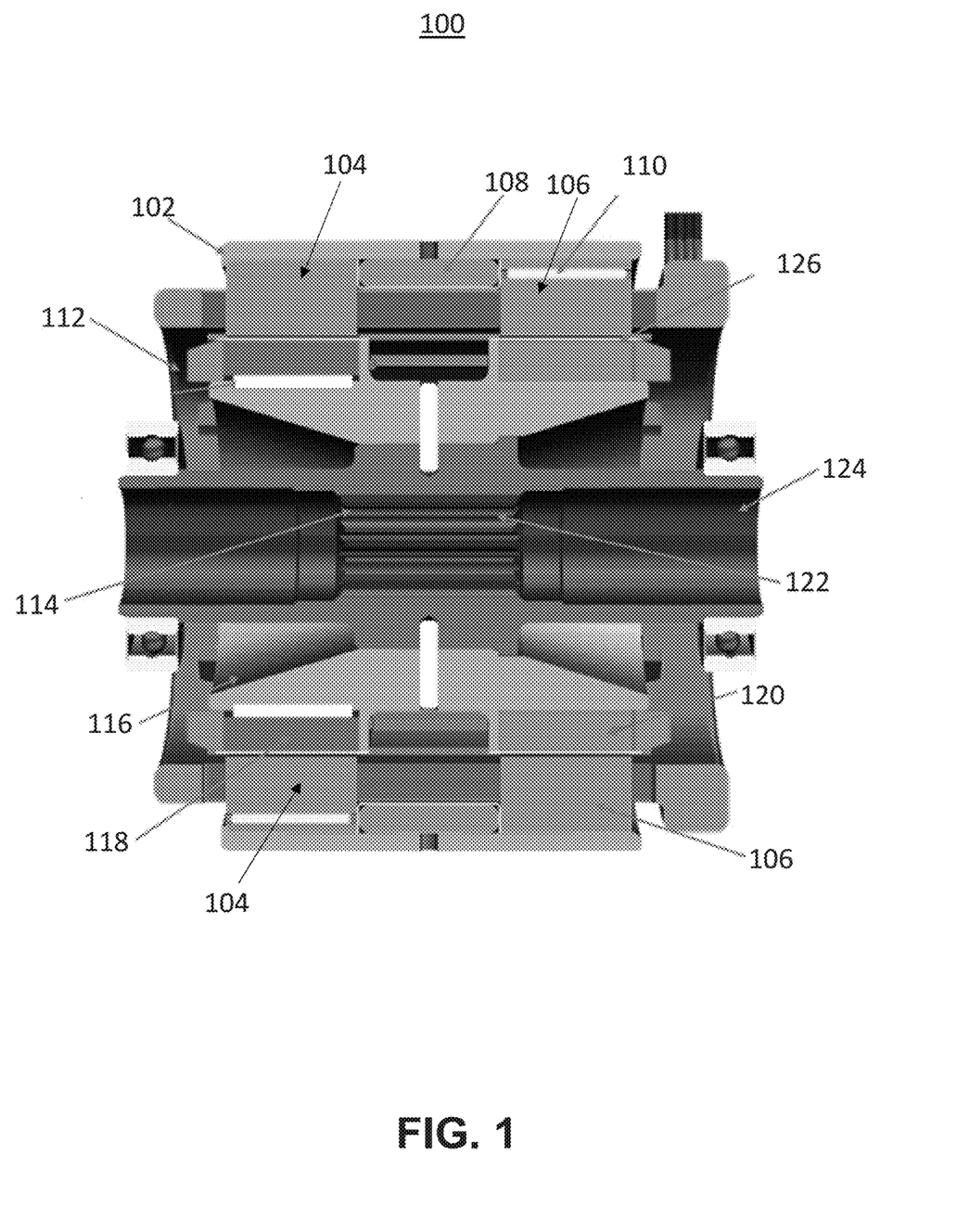
FIG. 1 illustrates a hybrid homopolar generator in accordance with several aspects disclosed herein.
Figure 2:
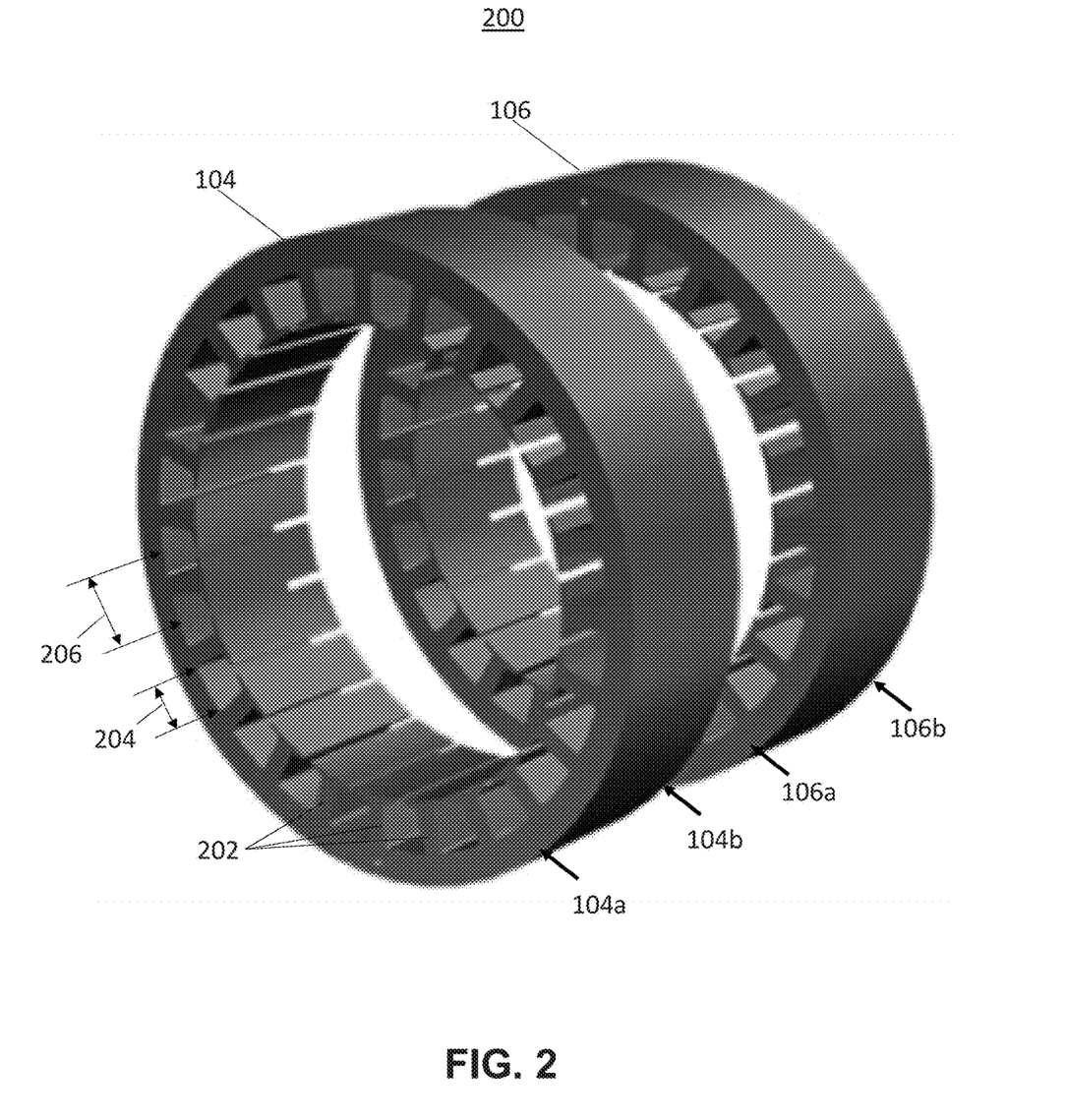
FIG. 2 illustrates a view of a stator in accordance with several aspects disclosed herein.
Figure 3:
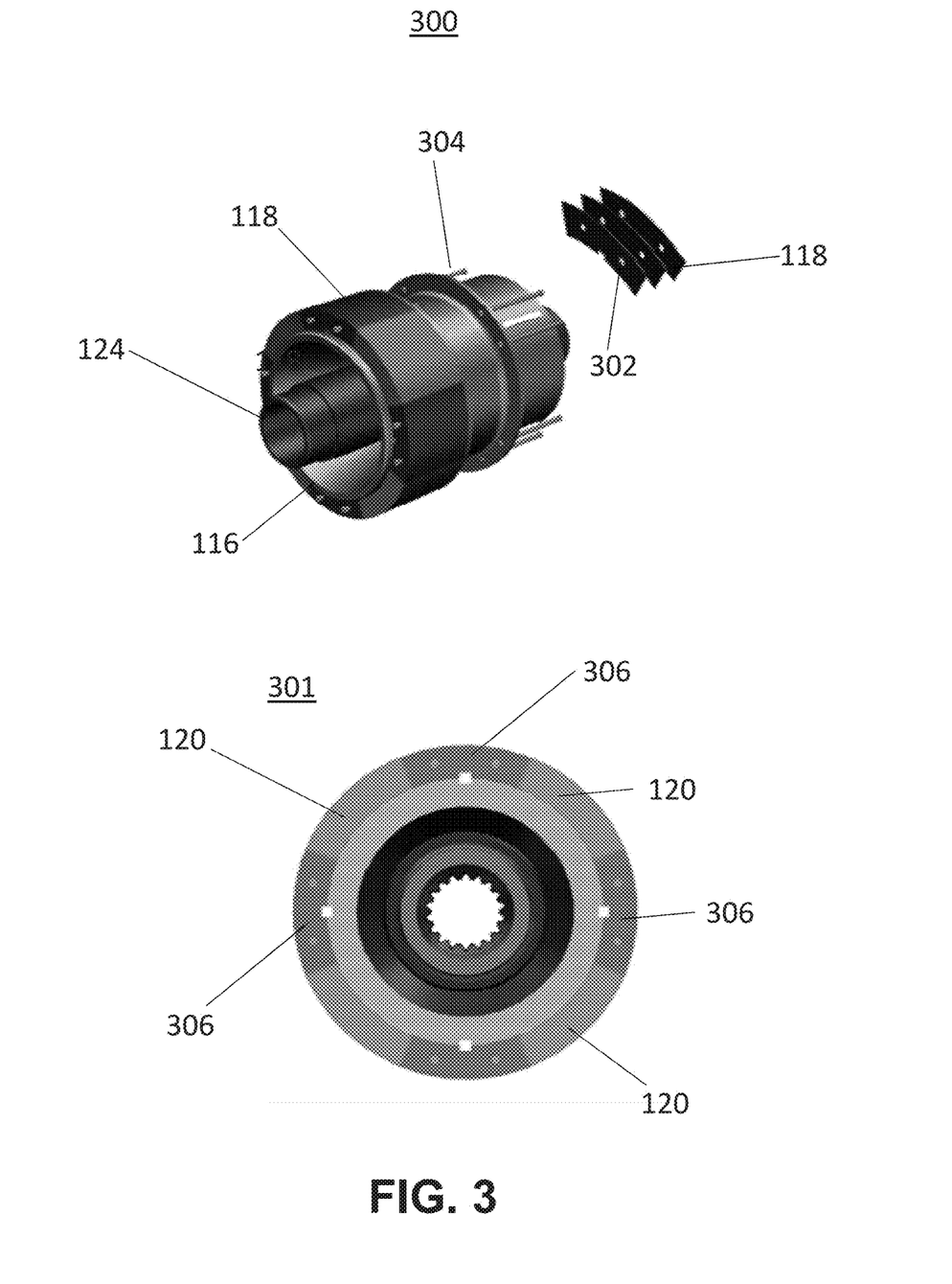
FIG. 3 illustrates views of a rotor in accordance with several aspects disclosed herein.

For clarity and for context, the general architecture of a hybrid homopolar machine is described with respect to FIGS. 1-3. Step skewing, and more specifically, the structural features which cause the reduction or the removal of the ripples in the hybrid homopolar machine's output voltage and electromagnetic torque signals are described with respect to FIGS. 4-7.

FIG. 1 illustrates a hybrid homopolar electrical generator 100. The generator 100 includes a stator that includes a yoke 102 surrounding a first stator stack 104 and a second stator stack 106. The generator 100 further includes a field coil 108 disposed between the first stator stack 104 and the second stator stack 106.

The generator 100 further includes a rotor that comprises a drive spline 114 that is part of the rotor shaft 124. Fitted over the rotor shaft 124 is the rotor hub 116, which includes a magnetic flux conducting material. Laminated stacks 118, which can be made of a magnetic flux conducting material such as silicon steel, are fitted at either end of the rotor hub, in several peripherally discrete groupings. The groupings of the lamination stacks are called poles. The permanent magnets 120 are fitted peripherally in between lamination stacks 118. The lamination stacks 118 and the permanent magnets 120 are covered by a rotor sleeve 126.

FIG. 2 illustrates a close up view 200 of the stator included in the exemplary generator 100. As previously stated, the stator includes a first stack 104 and a second stack 106; each of these stacks includes a set of teeth 202 that are spaced according to an angular measured slot pitch 206, the slot being the distance 204 between the sides of two teeth 202.

FIG. 3 illustrates a view 300 of the rotor included in the exemplary generator 100. The laminated stacks 118 are placed at either end of the rotor hub 116, thus forming two distinct regions, each coinciding in position with the stator stacks (104 and 106) once the rotor and stator are assembled. The laminated stacks 118, forming structures called poles 306, can include holes 302 for keying the inductor poles 306 onto the rotor by means of rivets or screws 304. The bottom panel of FIG. 3 illustrates a cross-sectional view 301 which shows peripherally alternating flux-conducting inductor poles 306, being comprised of the lamination stacks 118 and the permanent magnets 120.

Figure 4:
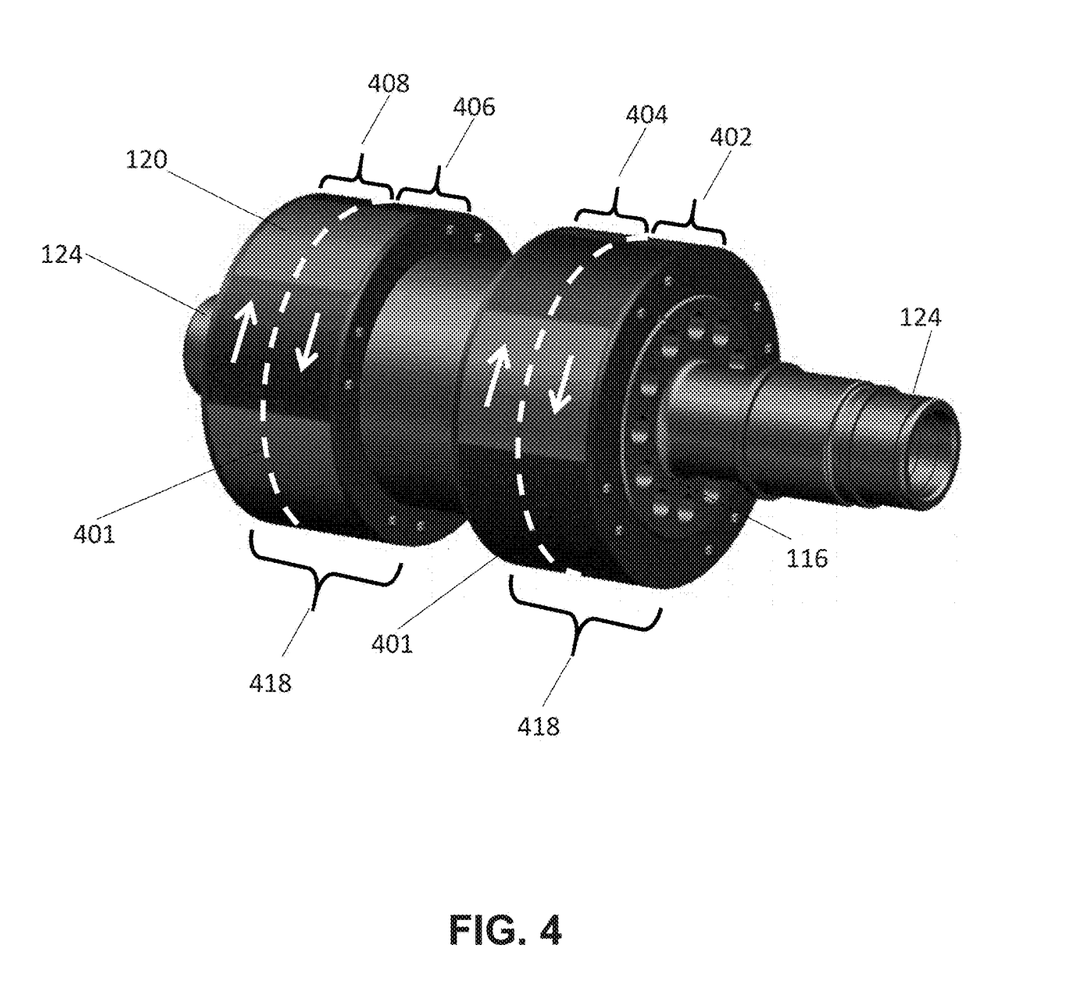
FIG. 4 illustrates a view of a rotor in accordance with several aspects disclosed herein.

FIG. 4 illustrates a view 400 of an exemplary rotor that utilizes step skewing to reduce ripples in the output voltage and in the electromagnetic torque of the generator 100. Each pole and magnet assembly 418 is subdivided axially (along lines 401) and each subsection of a pole and magnet assembly 418 is rotated in a direction opposite to the to the other subsubsection of the same pole and magnet assembly 418 but in the same direction as that of the corresponding subsection on the other pole and magnet assembly 418.

For example, in FIG. 4, considering the rear pole and magnet assembly 418, the subsection 408 is rotated clockwise, i.e., in a direction opposite to the rotation of the subsection 406, which is rotated counter-clockwise. However, with respect to its corresponding subsection 404 on the front pole and magnet assembly 418, the subsection 408 is rotated in the same direction as that of the subsection 404. Moreover, the rotation of the subsection 404 is opposite to the direction of rotation of the subsection 402 on the front pole and magnet assembly 418. It is noted that the direction of rotation shown by the arrows in FIG. 4 can be reversed without departing from the teachings of this disclosure.

Figure 5:
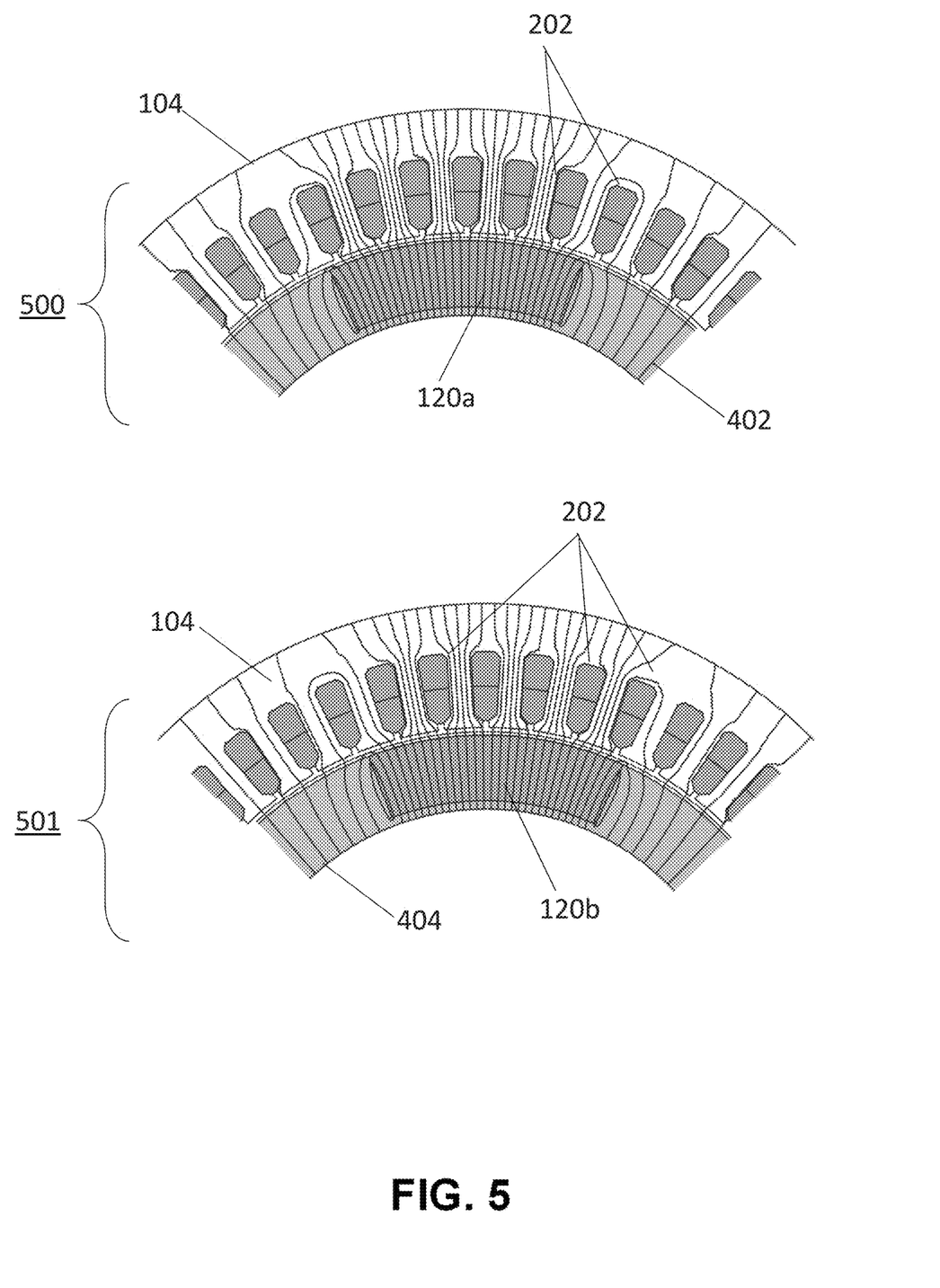
FIG. 5 illustrates sections of a rotor and a stator in accordance with several aspects disclosed herein.

The step skewing procedure effectively repositions the magnetic elements of the rotor with respect to the stator teeth 202, as illustrated in FIG. 5. The cross-sectional view 500 shows the front pole and magnet assembly 418 of the rotor (assembled with the stator, i.e., with the first stator stack 104). As discussed in FIG. 4, step skewing involves sectioning the pole and magnet assembly 418 axially. As such, the magnet 120 shown in FIG. 4 becomes two magnets (120a and 120b), each one belonging to a subsection of the pole and magnet assembly 418 as result of the step skewing.

As shown in the cross-sectional view 500, the subsection 402 is rotated counter-clockwise, and in the cross-sectional view 501, the subsection 404 is rotated clockwise. In some embodiments, for each subsection, the extent to which the rotation is performed can be about one quarter (¼) of the angular slot pitch (i.e., ¼ of the angular distance 206 in FIG. 2). As a result, the displacement of the subsection 402 with respect to the subsection 404 (or vice versa) is about one half (½) of the angular slot pitch.

Figure 6:
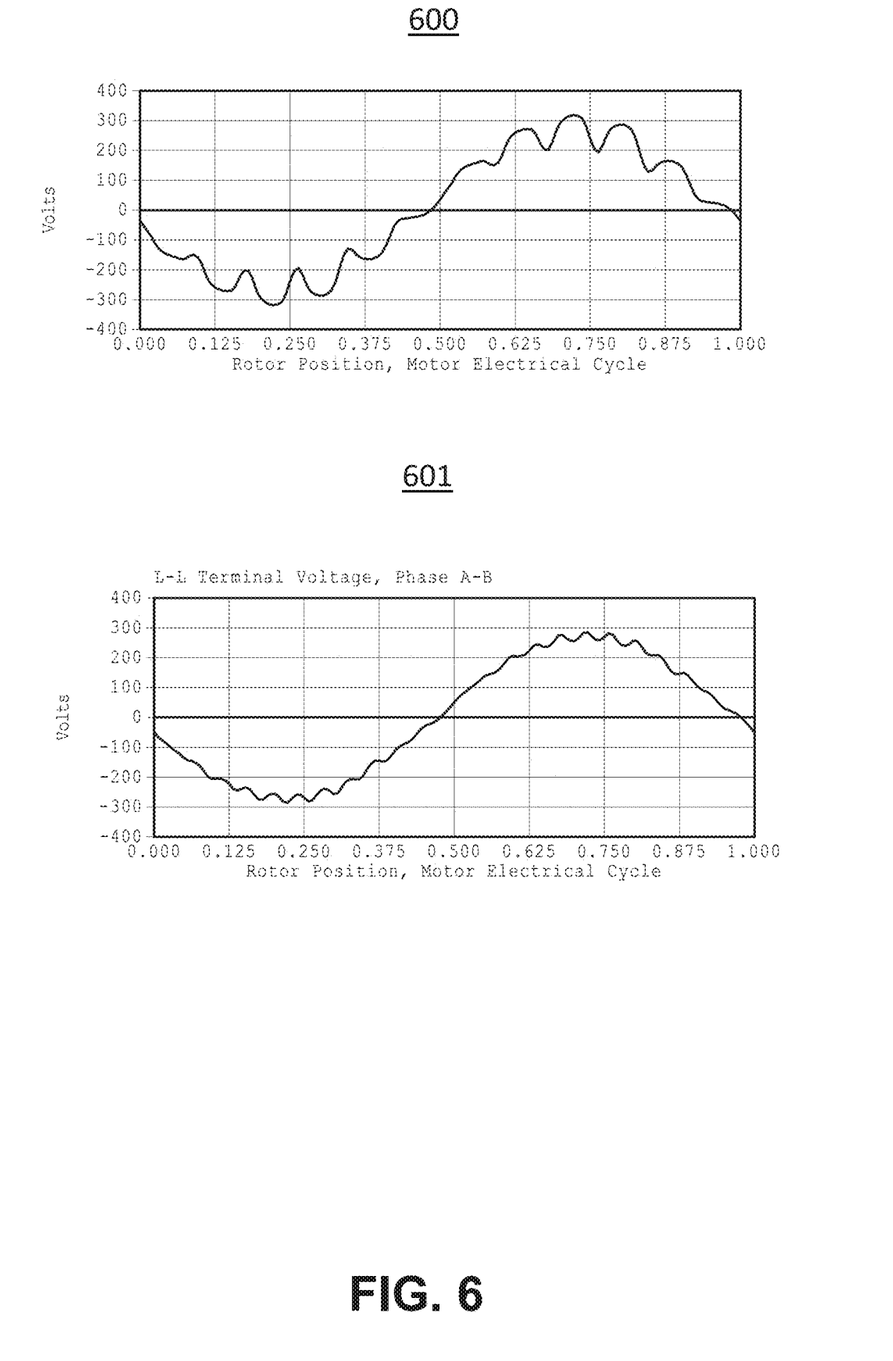
FIG. 6 illustrates performance charts of a generator in accordance with several aspects disclosed herein.

Having set forth several structural embodiments and described their operation, performance charts showing the advantageous effects of step skewing are now shown and compared with performance data from generators where no step skewing is used. For example, FIG. 6 illustrates a chart 600 showing the output voltage of a generator 100 in which no step skewing is used. As shown in the chart 600, the output voltage signal with respect to position includes ripples which, as mentioned above, can cause heating and losses at a load driven by the generator 100.

Figure 7:
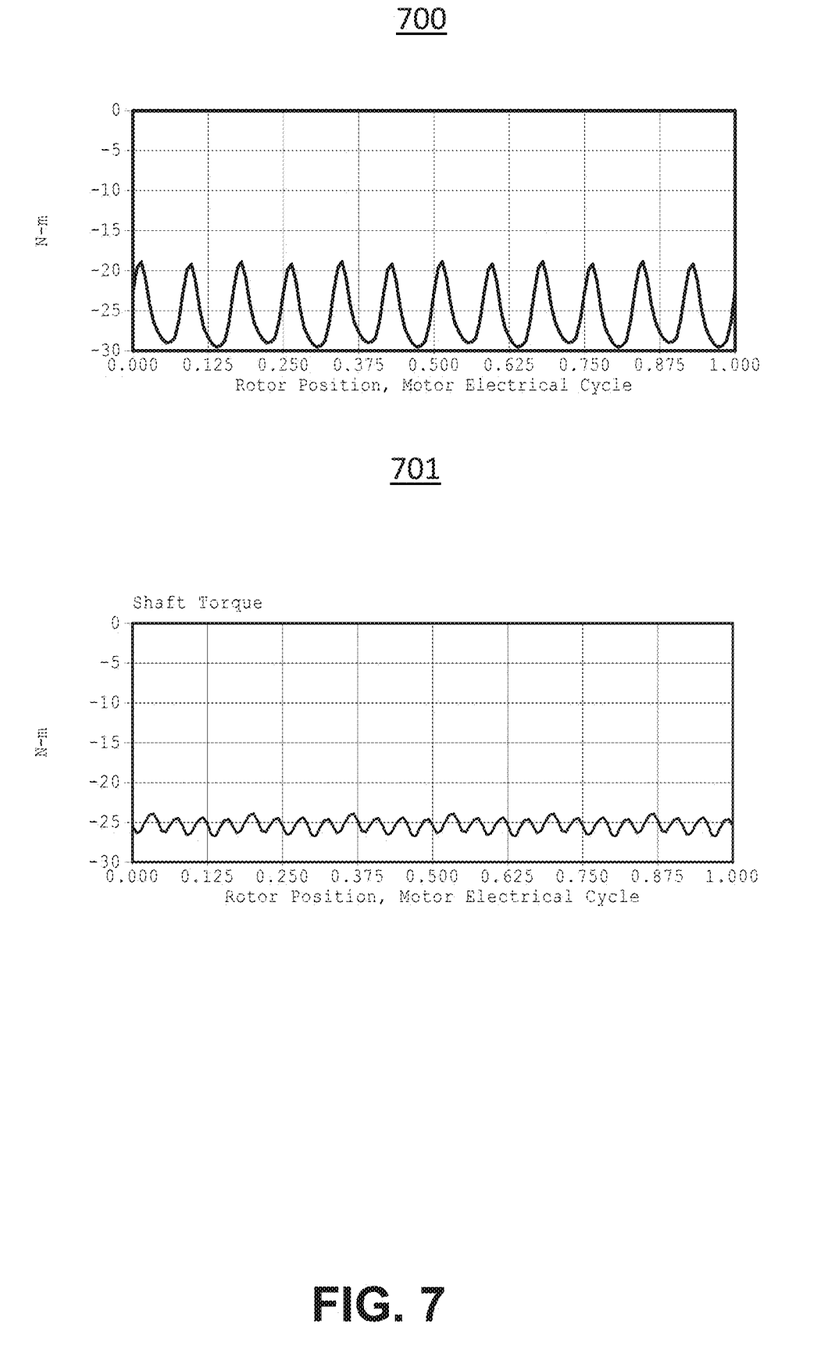
FIG. 7 illustrates performance charts of a generator in accordance with several aspects disclosed herein.

Conversely, when step skewing is used, i.e. as is shown in FIGS. 4 and 5, the output voltage includes significantly reduced ripples (see chart 601), thus yielding an output voltage signal whose harmonics component is substantially lowered. Thus, step skewing the rotor pole and magnet assemblies allows for significant reductions in losses at the load and ensures efficient power delivery and load operation. Similarly, FIG. 7 illustrates a chart 700 in which the electromagnetic torque signal includes ripples in the absence of step skewing. In contrast, when step skewing is used (chart 701), the torque signal is substantially flat, thus ensuring proper rotor operation stability, as well as reducing vibration and noise throughout.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. An electric machine, comprising:
   a rotor comprising a first pole and magnet assembly and second pole and magnet assembly, each pole and magnet assembly being divided axially in a first subsection including a first set of peripherally alternating poles and magnets and a second subsection including a second set of peripherally alternating poles and magnets;
   wherein, in each pole and magnet assembly, the first subsection is rotationally displaced in a direction opposite the second subsection;
   wherein, the first and second subsections of the first pole and magnet assembly are arranged in an alternating rotational displacement pattern with respect to the first and second subsections of the second pole and magnet assembly; and wherein a position of a first magnet in the first set is offset from a position of a second magnet in the second set such that magnets of the first subsection and magnets of the second subsection form a herringbone pattern.

2. The electric machine of claim 1, wherein the position of the first magnet and the position of the second magnet are offset relative to one another by about one half the angular slot pitch of a stator of the electric machine.

3. The electric machine of claim 1, wherein the rotor further comprises another pole and magnet assembly divided axially in a third subsection and a fourth subsection.

4. The electric machine of claim 3, wherein each of the third and fourth subsections includes poles and magnets.

5. The electric machine of claim 4, wherein the poles and magnets of the third subsection are offset from the poles and magnets of the fourth subsection.

6. The electric machine of claim 5, wherein the poles and magnets of the third subsection and the poles and magnets of the fourth subsection are offset by about one half the angular slot pitch of a stator of the electric machine.

7. The electric machine of claim 3, wherein the first and third subsections are disposed rotationally about a shaft of the rotor in the same position but in a different position with respect to the second and fourth subsections.

8. The electric machine of claim 3, wherein the second and fourth subsections are disposed rotationally about a shaft of the rotor in the same position but in a different position with respect to the first and third subsections.

9. The electric machine of claim 1, wherein the electric machine is a hybrid homopolar electric machine.

10. The electric machine of claim 1, wherein the electric machine is a hybrid homopolar generator.

11. An electric machine, comprising: a stator include a first stator stack and a second stator stack;
a rotor comprising a first pole and magnet assembly corresponding to the first stator stack and a second pole and magnet assembly corresponding to the second stator stack, each pole and magnet assembly being divided axially in a first subsection including a first set of peripherally alternating poles and magnets and a second subsection including a second set of peripherally alternating poles and magnets,
wherein, in each pole and magnet assembly, the first subsection is rotationally displaced in a direction opposite the second subsection;
wherein, the first and second subsections of the first pole and magnet assembly are arranged in an alternating rotational displacement pattern with respect to the first and second subsections of the second pole and magnet assembly; and
wherein in each pole and magnet assembly a position of a first magnet in the first set is offset from a position of a second magnet in the second set such that magnets of the first subsection and magnets of the second subsection form a herringbone pattern.

12. The electric machine of claim 11, wherein the poles and magnets of the first subsection and the poles and magnets of the second subsection are offset by one half the angular slot pitch of the stator.

13. The electric machine of claim 11, wherein the poles and magnets of the first subsection is offset with respect to a stator tooth of the stator by about one quarter of the angular slot pitch.

14. The electric machine of claim 11, wherein the poles and magnets of the second subsection is offset with respect to a stator tooth of the stator by about one quarter of the angular slot pitch.

15. The electric machine of claim 11, wherein the first subsection of the first pole and magnet assembly and the first subsection of the second pole and magnet assembly have no offset with respect one another.

16. The electric machine of claim 11, wherein second subsection of the first pole and magnet assembly and the second subsection of the second pole and magnet assembly have no offset with respect to one another.

17. The electric machine of claim 11, wherein the first subsection of the first pole and magnet assembly and the first subsection of the second pole and magnet assembly are disposed rotationally about a shaft of the rotor in the same position but in a different position with respect to the second subsection of the first pole and magnet assembly and the second subsection of the second pole and magnet assembly.

18. The electric machine of claim 11, wherein the second subsection of the first pole and magnet assembly and the second subsection of the second pole and magnet assembly are disposed rotationally about a shaft of the rotor in the same position but in a different position with respect to the first subsection of the first pole and magnet assembly and the first subsection of the second pole and magnet assembly.

19. The electric machine of claim 11, wherein the electric machine is a hybrid homopolar electric machine.

20. The electric machine of claim 11, wherein the electric machine is a hybrid homopolar generator.

* * * * *